United States Patent
Ikeuchi et al.

(10) Patent No.: US 11,443,161 B2
(45) Date of Patent: Sep. 13, 2022

(54) ROBOT GESTURE GENERATION

(71) Applicant: MICROSOFT TECHNOLOGY LICENSING, LLC, Redmond, WA (US)

(72) Inventors: Katsushi Ikeuchi, Beijing (CN); Mona Soliman Habib, Redmond, WA (US)

(73) Assignee: MICROSOFT TECHNOLOGY LICENSING, LLC, Redmond, WA (US)

( * ) Notice: Subject to any disclaimer, the term of this patent is extended or adjusted under 35 U.S.C. 154(b) by 660 days.

(21) Appl. No.: 16/469,024

(22) PCT Filed: Dec. 12, 2016

(86) PCT No.: PCT/CN2016/109547
§ 371 (c)(1),
(2) Date: Jun. 12, 2019

(87) PCT Pub. No.: WO2018/107343
PCT Pub. Date: Jun. 21, 2018

(65) Prior Publication Data
US 2019/0385040 A1    Dec. 19, 2019

(51) Int. Cl.
*G06N 3/00* (2006.01)
*B25J 9/16* (2006.01)
(Continued)

(52) U.S. Cl.
CPC .............. *G06N 3/008* (2013.01); *B25J 9/163* (2013.01); *B25J 9/1697* (2013.01);
(Continued)

(58) Field of Classification Search
CPC .............. G10L 15/22; G10L 2015/225; G10L 2015/223; G10L 21/0208; B25J 9/16;
(Continued)

(56) References Cited

U.S. PATENT DOCUMENTS 7,136,818 B1    11/2006    Cosatto et al.
8,224,652 B2    7/2012    Wang et al.
(Continued)

FOREIGN PATENT DOCUMENTS

CN    102506518 A    7/2012
CN    103119644 A    5/2013
(Continued)

OTHER PUBLICATIONS

Fransen et al., Using vision, acoustics, and natural language for disambiguation, 2007, IEEE, p. 73-80 (Year: 2007).*
(Continued)

*Primary Examiner* — McDieunel Marc (57) ABSTRACT

A method and apparatus for robot gesture generation is described. Generally speaking, a concept corresponding to a utterance to be spoken by a robot is determined (204). After a concept is determined or selected, a symbolic representation of a gesture that corresponds to the determined concept is retrieved from a predetermined gesture library (206). Subsequently, the symbolic representation is provided to cause the robot to perform the gesture (208). In such way, a more natural, comprehensive and effective communication between human and robots may be achieved.

20 Claims, 5 Drawing Sheets

(51) Int. Cl.
- B25J 11/00 (2006.01)
- G10L 15/22 (2006.01)
- G06V 40/20 (2022.01)

(52) U.S. Cl.
CPC ........... *B25J 11/0005* (2013.01); *G06V 40/28* (2022.01); *G10L 15/22* (2013.01); *G10L 2015/223* (2013.01); *G10L 2015/225* (2013.01)

(58) Field of Classification Search
CPC ...... B25J 9/163; B25J 9/1697; B25J 11/0005; B25J 19/026; B25J 11/003; B25J 9/1602; G06N 5/022; G06N 3/008; G06V 40/28

See application file for complete search history.

(56) References Cited

U.S. PATENT DOCUMENTS

| | | | |
|---|---|---|---|
| 8,751,215 B2* | 6/2014 | Tardif | G06V 40/28 704/4 |
| 9,302,393 B1 | 4/2016 | Rosen et al. | |
| 9,452,525 B2 | 9/2016 | Ziegler et al. | |
| 9,868,212 B1* | 1/2018 | Hinterstoisser | B25J 9/1671 |
| 11,250,844 B2* | 2/2022 | Mont-Reynaud | G10L 15/08 |
| 11,279,041 B2* | 3/2022 | Mahoor | G10L 25/63 |
| 11,285,614 B2* | 3/2022 | Hayashi | B25J 5/00 |
| 2020/0357423 A1* | 11/2020 | Ikeuchi | B25J 11/0005 |

FOREIGN PATENT DOCUMENTS

| | | |
|---|---|---|
| CN | 104350541 A | 2/2015 |
| CN | 105930785 A | 9/2016 |
| WO | 2012010437 A1 | 1/2012 |
| WO | 2015/158887 A2 | 10/2015 |

OTHER PUBLICATIONS

Vallee et al., Improving user interfaces of interactive robots with multimodality, 2009, IEEE, p. 1-6 (Year: 2009).*

Miners et al., Understanding hand gestures using approximate graph matching, 2005, IEEE, p. 239-248 (Year: 2005).*

Perzanowski et al., Integrating natural language and gesture in a robotics domain, 1998, IEEE, p. 247-252 (Year: 1998).*

"Office Action Issued in Indian Patent Application No. 201917021522", dated Jun. 30, 2021, 7 Pages.

Calvert, et al., "Aspects of the Kinematic Simulation of Human Movement", In Journal of IEEE Computer Graphics and Applications, vol. 2, Issue 9, Nov. 1982, pp. 41-50.

Hamtteman, Danny M.J., "Conveying Information through Non-Verbal Communication in Robotics", In Master of Science Thesis, Apr. 20, 2016, 124 Pages.

Ikeuchi, et al., "Describing Upper Body Motions based on the Labanotation for Learning-from-Observation Robots", In Proceedings of Computer Research Repository, Sep. 2016, 9 Pages.

Liu, et al., "How to Train Your Robot—Teaching service robots to reproduce human social behavior", In Proceedings of the 23rd IEEE International Symposium on Robot and Human Interactive Communication, Aug. 25, 2014, pp. 961-968.

Salway, Andrew, "Video Annotation: the Role of Specialist Text", A Thesis Submitted for the Partial Fulfillment of the Requirements for the Degree of Doctor of Philosophy, Department of Computing, School of Electronic Engineering, Information Technology and Mathematics, University of Surrey, Dec. 1999, 188 Pages.

Santos, Luis Carlos., "Laban Movement Analysis: A Bayesian Computational Approach to Hierarchical Motion Analysis and Learning", A Dissertation Submitted for the Partial Fulfillment of Degree of Doctor of Philosophy, Faculty of Science and Technology, Department of Electrical and Computing Engineering, University of Coimbra, Sep. 2013, 198 Pages.

Stiefelhagen, et al., "Enabling Multimodal Human-Robot Interaction for the Karlsruhe Humanoid Robot", In Journal of IEEE Transactions on Robotics, vol. 23, Issue 5, Oct. 2007, 11 Pages.

"First Office Action and Search Report Issued in Chinese Patent Application No. 201680091517.3", dated Nov. 25, 2021, 20 Pages.

"Supplementary Search Report Issued in European Patent Application No. 16923912.6", dated Jul. 10, 2020, 10 Pages.

Aly, et al., "A Model for Synthesizing a Combined Verbal and NonVerbal Behaviour Based on Personality Traits in Human-Robot Interaction", In Proceedings of the 8th ACM/IEEE International Conference on Human-Robot Interaction, Mar. 3, 2013, pp. 325-332.

Kim, et al., "Automated Robot Speech Gesture Generation System Based on Dialog Sentence Punctuation Mark Extraction", In Proceedings of the IEEE/SICE International Symposium on System Integration (SII), Dec. 16, 2012, pp. 645-647.

NG-THOW-HING, et al., "Synchronized Gesture and Speech Production for Humanoid Robots", In Proceedings of the IEEE/RSJ International Conference on Intelligent Robots and Systems, Oct. 18, 2010, pp. 4617-4624.

Okuno, et al., "Providing Route Directions: Design of Robot's Utterance, Gesture, and Timing", In Proceedings of the 4th ACM/IEEE International Conference on Human-Robot Interaction, Mar. 11, 2009, pp. 53-60.

Sargin, et al., "Combined Gesture-Speech Analysis and Speech Driven Gesture Synthesis", In Proceedings of the IEEE International Conference on Multimedia and Expo, Jul. 9, 2006, pp. 893-896.

International Search Report and Written Opinion for PCT/CN2016/109547, dated Sep. 14, 2017.

"Office Action Issued in Chinese Patent Application No. 201680091517.3", dated Apr. 12, 2022, 10 Pages.

* cited by examiner

ROBOT GESTURE GENERATION

CROSS-REFERENCE TO RELATED APPLICATION

This application is a U.S. National Stage Application of PCT/CN2016/109547, filed Dec. 12, 2016, which application is hereby incorporated by reference. To the extent appropriate, a claim of priority is made to each of the above disclosed application.

BACKGROUND

Numerous types of robots have been used in a wide variety of applications. Traditionally, robots are mainly used in industrial applications. Recently, more and more robots have been utilized in the field of human-robot interaction, such as robots that are used in family service and medical service. With such trend, how to realize a more natural and smoother communication between a human being and a robot attracts more attention.

SUMMARY

Embodiments of the subject matter described herein provide a method, apparatus and robot system for robot gesture generation. Generally speaking a concept corresponding to a utterance to be spoken by a robot is determined. After the concept is determined or selected, a symbolic representation of a gesture that corresponds to the determined concept is retrieved from a predetermined gesture library. Subsequently, the symbolic representation is provided to cause the robot to perform the gesture.

On the contrary to the conventional chatting robots, which may not be provided with any gesture responses along with the spoken utterances from chatting intelligence, or may only provide limited but not appropriate gesture function, embodiments of the present disclosure provide a method and an apparatus for robot gesture generation, especially in a chatting robot system, which enable a generation of appropriate gesture along with or in synchronization with the spoken utterances. In such way, a more natural, comprehensive and effective communication may be achieved between human and robots.

It is to be understood that the Summary is not intended to identify key or essential features of implementations of the subject matter described herein, nor is it intended to be used to limit the scope of the subject matter described herein. Other features of the subject matter described herein will become easily comprehensible through the description below.

DESCRIPTION OF DRAWINGS

The above and other objectives, features and advantages of the subject matter described herein will become more apparent through more detailed depiction of example embodiments of the subject matter described herein in conjunction with the accompanying drawings, wherein in the example embodiments of the subject matter described herein, same reference numerals usually represent same components.

Throughout the drawings, the same or similar reference symbols are used to indicate the same or similar elements.

DETAILED DESCRIPTION OF EMBODIMENTS

Principles of the present disclosure will now be described with reference to several example embodiments shown in the drawings. Though example embodiments of the present disclosure are illustrated in the drawings, it is to be understood that the embodiments are described only to facilitate those skilled in the art in better understanding and thereby achieving the present disclosure, rather than to limit the scope of the disclosure in any manner.

As used herein, the phrase "include(s)" and its variants shall be interpreted as an open term meaning "including but not limited to." The phrase "based on" shall be interpreted as "at least partially based on." The term "a" is to be read as "one or more" unless otherwise specified. The phrase "an embodiment" or "one embodiment" shall be interpreted as "at least one embodiment." The phrase "another embodiment" shall be interpreted as "at least one other embodiment." The phrases like "first" and "second" may refer to different or the same objects. Other definitions might also be included explicitly and implicitly in the following description.

Figure 1:
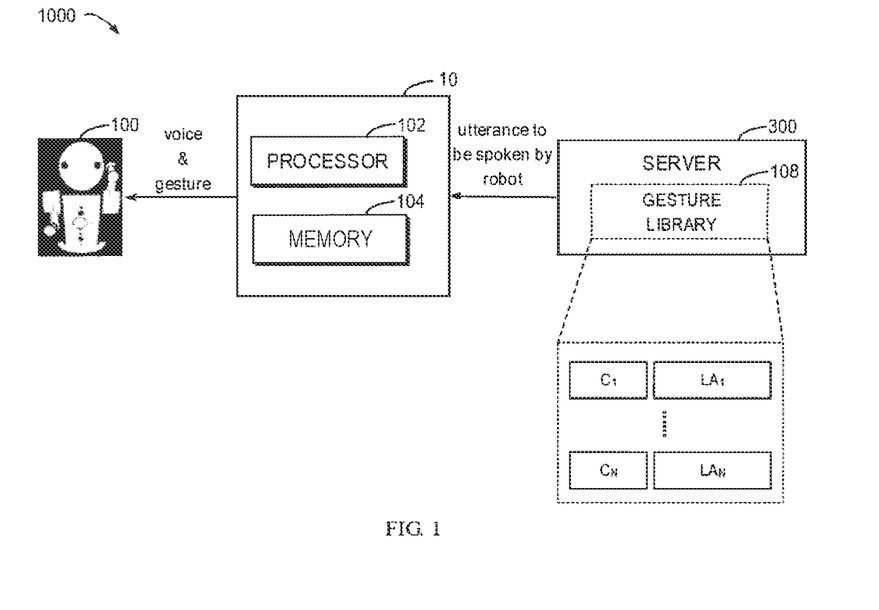
FIG. 1 is a schematic diagram illustrating a robot system in which example implementations of the subject matter described herein can be implemented.

FIG. 1 illustrates a schematic diagram of a robot system 1000 according to embodiments of the present disclosure. As shown in FIG. 1, the robot system 1000 generally includes a robot 100, a server 300, and an apparatus 10 according to embodiments of present application. The apparatus 10 is used for generating appropriate gesture along with the spoken utterances, depending on the utterance to be spoken by the robot 100.

The robot 100 may be, for example, a chatting robot. The server 300 is usually a device capable of processing the received message and providing the processed information and may be in the form of a cloud-based computer, for example, a chatting intelligence for the case of a chatting robot. That is, a user may have a "conversation" with the chatting intelligence 300 through, for example, an audio-visual-tactile intelligence.

During a normal chatting process between a user (not shown) and the robot 100, the user may first make expressions or ask questions to the robot 100, and then expect to receive a response, such as an answer to the user's question, from the robot 100.

Conventionally, after the server 300 receives the expressions/utterances from the user via a robot, the processor associated with the server 300 may perform some analyses based on the received expressions/questions, and prepare accordingly a response or an answer to the expression that is to be spoken by the robot 100. However, as mentioned above, some conventional chatting robots are not provided with any motion or gesture functions. Some other conventional chatting robots, on the other hand, may be able to provide some gestures along with the spoken utterances, these gestures, however, may not be appropriate/correct ones, and for most of cases, these generated gestures may just be random ones.

According to various embodiments of the present application, an appropriate gesture response to the user along with or in synchronization with the voice output from the robot 100 can be achieved. In other words, a translation mechanism from spoken language to gestures can be realized. Furthermore, due to the fact that those gestures are generated based on the to-be-spoken utterances, or at least based on some concepts extracted from those utterances, the generated gesture in such a way would be more accurate and natural.

For the sake of discussions, example implementations of the subject matter described herein will be described with reference to the robot system 1000. However, it is to be understood that such a robot system 1000 is described merely for the purpose of illustration, without suggesting any limitations as to the scope of the subject matter described herein. For example, the ideas and principles are applicable to a stand-alone machine as well.

Figure 2:
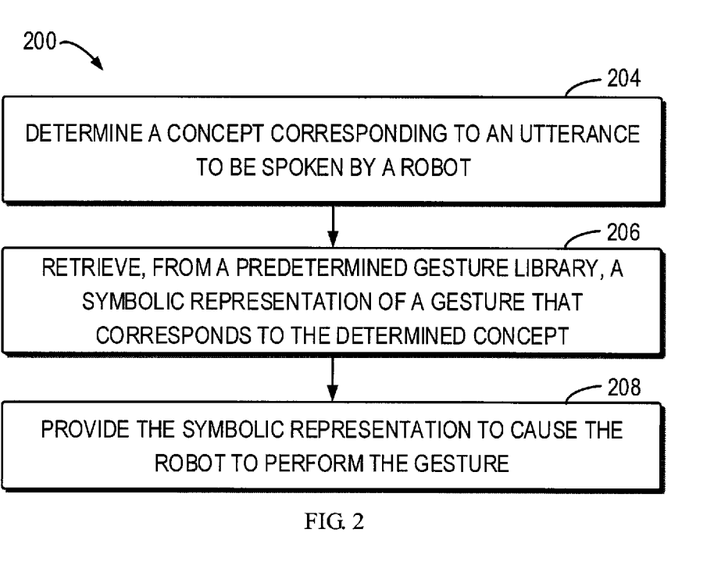
FIG. 2 illustrates a flowchart of a method for robot gesture generation according to embodiments of the present disclosure.

FIG. 2 illustrates a flow chart of a method 200 for robot gesture generation according to embodiments of the present disclosure. The method 200 can be executed, for example, on the apparatus 10 as illustrated in FIG. 1. The apparatus 10 as shown can be a client device or a cloud-based apparatus, or it can be part of the server 300 as illustrated in FIG. 1. It should be understood that the method 200 may also include additional actions not shown and/or omit the illustrated steps. Scope of the subject matter described herein is not limited in this aspect.

The method 200 will be described as below with reference to FIG. 1, FIG. 3 and FIG. 4. At 204, one or more concepts $(C_1, C_2, \ldots, C_N)$ corresponding to a utterance to be spoken by a robot 100 may be determined. The utterance that is to be spoken by the robot 100 may be a proactive or responsive vocal interaction in a conversation with the user. It may be a bit of spoken language from a word, a phrase, a plurality of words to a full utterance. It is to be noted that although the utterance to be spoken as illustrated in FIG. 1 is received from the server 300, in some other embodiments, the utterance can be instead obtained directly from the apparatus 10.

As mentioned above, in some embodiments, the user may first make an expression/question to the robot 100 and further to the server 300 by, for example, transmitting his/her voice via a microphone and his/her image via a camera integrated on the robot 100. After the server 300 receives the expression/question from the user, the processor (not shown) associated with the server 300 will perform analyses based on the received expressions, and prepare a utterance that is to be spoken by the robot 100 accordingly, as a response or an answer to that question.

In some embodiments, the incoming expression/question from the user will be firstly checked locally. If it is included in a special set, or in other words, if it is one of special conversations, then an answer to this expression/question will be prepared in local. If not, the incoming expression/question will be further sent to the server 300 for a response.

In this context of the subject matter described herein, a concept is generally defined as one representative extracted from a cluster of words. The cluster of words may contain those words that share the same or a similar meaning within a context and thus are located in close proximity to one another in a vector space. Typical concepts may include, for example, "Hello," "Good," "Thanks," "Hungry," and so on. It is to be noted that scope of the subject matter described herein is not limited in the formats or contents included in the concepts. Users may define other particular concepts as needed.

The robot system 1000 as illustrated in FIG. 1 includes a gesture library 108 which is created to store a plurality of predetermined gestures and the corresponding concepts. In some embodiments, each concept that corresponds to a gesture in the gesture library 108 may be represented by a first vector. In this case, determining the concept $(C_1, C_2, \ldots, C_N)$ corresponding to the utterance may include obtaining a second vector representing the utterance, and then determining the similarity degrees of the second vector to the plurality of first vectors. In this way, based on the determined similarity degrees, the concept corresponding to the utterance can be selected from the plurality of concepts stored in the gesture library 108.

In an example embodiment, the received utterance or expression may be first given to a system, such as "distributed word embedding" system, to convert the utterance to a vector and thus map to a concept. Next, by examining the similarity degree between the vector converted from the utterance and each of those vectors from the gesture library 108, the concept having a maximum similarity degree may be selected from the plurality of concepts, as the determined concept corresponding to the utterance.

Figure 4:
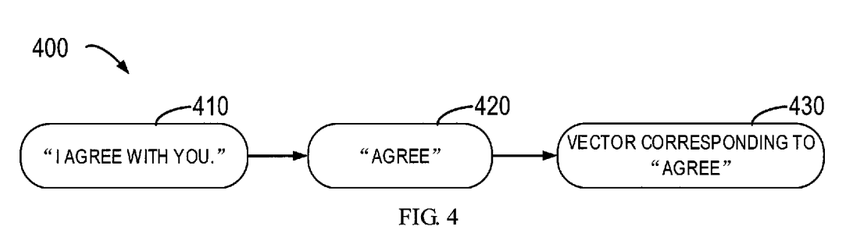
FIG. 4 illustrates a flowchart of a process for mapping a utterance to a vector according to embodiments of the present disclosure.

FIG. 4 shows an example illustrating a process 400 of conversion from an utterance to a vector. As shown in FIG. 4, the utterance 410 that is to be spoken by the robot 100 is "I agree with you," and the "distributed word embedding" system may determine the best matched concept 420, for example to be "agree," and then the concept "Agree" will be mapped to a corresponding vector 430 for comparison with those vectors stored in the gesture library 108. It is to be understood that although this example only describes a word-based matching mechanism (that is, based on a word-level similarity), the concept matching based on other levels of similarities, such as a phrase-level similarity, a sentence-level similarity, a document-level similarity and even a semantic-level similarity, are also possible.

Continuing to refer to FIG. 1, at 206, a symbolic representation $(SR_1, SR_2, \ldots, SR_N)$ of a gesture that corresponds to the determined concept $(C_1, C_2, \ldots, C_N)$ is retrieved from the predetermined gesture library 108.

In some embodiments, the gesture library 108 may be previously created by using a so-called "learning from observation" technique. In particular, a gesture of the robot 100 needs to be recorded first. The gesture is usually performed by a performer (for example, a human) in front of a camera in association with the robot 100. Some important poses from the performer then can be captured or "observed" by the camera and subsequently converted into symbolic representations (also called symbols for short) that correspond to the performed gesture. In some embodiments, retrieving the symbolic representation $(SR_1, SR_2, \ldots, SR_N)$ includes retrieving a labanotation $(LA_1, LA_2, \ldots, LA_N)$. Consequently, with the obtained labanotation, a relationship between the labanotation representing the performed gesture and a concept (e.g. labanotation-concept pairs) can be established and stored in the gesture library 108 for a future use.

Labanotation has been used for recording human dances. Labanotation herein particularly defines orientations of at least one body part of the robot 100 with respect to a plurality of time slots. According to the inventor's observation, the labanotation employed in the robot system 1000 is necessary and sufficient condition to describe human actions. This is because, watching the same dance by several dancers end up with the same lab anotation, and on the other hand, from one labanotation, any dancer may perform/reconstruct the same dance.

Furthermore, labanotation is machine-independent (or hardware-independent), and thereby can overcome the hardware difference. In addition, as a concise symbolic representation, it is easy to transmit labanotation between a robot and the cloud computer through limited communication channels. Also, labanotation requires smaller memory than other types of representations.

In some embodiments, through a continuously captured/recorded gesture, orientations of the at least one body part of the robot 100 in the plurality of time slots 301 can be determined, and then symbols corresponding the orientations can be obtained. After that, the symbols in association with the corresponding time slots 301 as a part of the labanotation can be saved.

In some embodiments, the at least one body part includes a plurality of body parts, and the labanotation includes a first dimension corresponding to the plurality of time slots 301 and a second dimension corresponding to the plurality of body parts (that is, two-dimensional labanotation). FIG. 3A illustrated such a 2D labanotation representative of a concept of "Good". In this labanotation, each of columns (that is, the second dimension) corresponds to one specific body part, such as left hand, left arm, support, right arm, right hand, head. Each row (that is, the first dimension) corresponds to the time slots 301 with a given duration. Further, a symbol represents to which direction that the body part is oriented at that time.

Figure 3A:
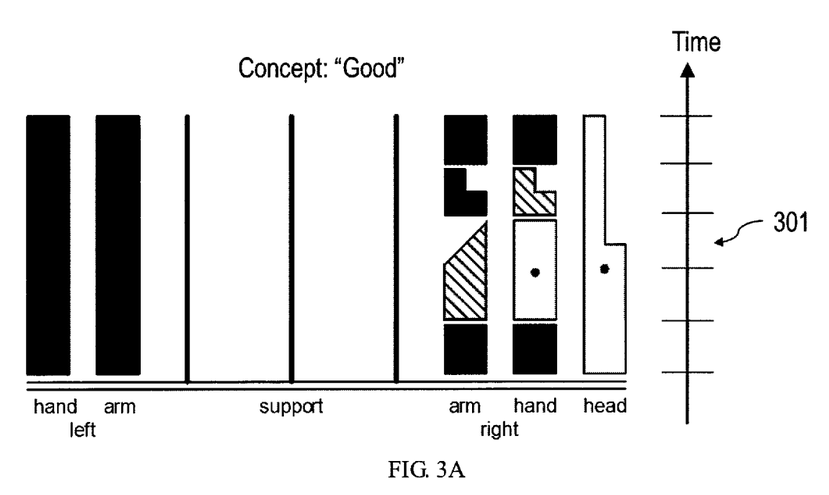
FIG. 3A illustrates a schematic diagram of a typical labanotation and the corresponding concept represented by the labanotation according to embodiments of the present disclosure.
Figure 3B:
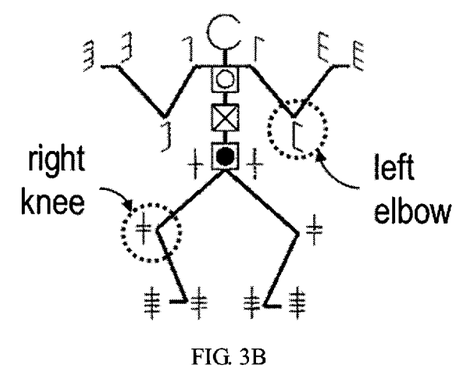
FIG. 3B illustrates example symbols of body parts of a robot.

It is to be noted that the sample labanotation in FIG. 3A is merely shown for purpose of illustration without suggesting any limitation as to the scope of the subject matter described herein. In other words, a more complicated labanotation with more body parts involved, such as left elbow or right knee (labeled by dotted circles) as shown in FIG. 3B is also possible.

Alternatively or additionally, for the previously created the gesture library 108, a plurality of labanotations of a plurality of gestures can be grouped into a cluster of labanotation, and for each cluster of labanotation, a representative labanotation can be determined. In this case, among multiple labanotations, similar labanotations indicating similar gestures can be clustered/grouped. As a result, a cluster of labanotation/gestures (rather than a single labanotation/gesture) is represented by a representative labanotation. In this way, it is guaranteed that any concepts corresponding to a same cluster will give a same gesture.

Compared to the gesture library 108 containing "one-to-one" concept-labanotation pairs, the gesture library 108 created in such an alternative way described as above contains "multiple-to-one" concepts to labanotation matches. Accordingly, retrieving, from the predetermined gesture library 108, a symbolic representation ($SR_1$, $SR_2$, . . . , $SR_N$) of a gesture that corresponds to the determined concept ($C_1$, $C_2$, . . . , $C_N$) includes obtaining a second vector representing the utterance, and determining similarity degrees of the second vector to the plurality of first vectors, and then selecting, from the plurality of concepts, the concept corresponding to the utterance based on the similarity degrees. With the selected concept, the retrieving step further includes determining a cluster of symbolic representation to which the selected concept corresponds, for example based upon the similarity of labanotations, and then retrieving, from the cluster of symbolic representation, a representative symbolic representation stored in the gesture library 108.

At 208, the symbolic representation is provided to cause the robot 100 to perform the gesture. In some embodiments, causing the robot 100 to perform the gesture includes executing the labanotation along the first dimension to trigger the plurality of body parts to perform the gesture according to the respective orientations in the plurality of time slots 301.

As shown in FIG. 3A, when executing the labanotation as shown in FIG. 3A, the time passes from the bottom to the top (as labeled by the arrow), and a specific combination of various symbols indicating the various orientations of multiple body parts at a given time slot 301 will be executed, so that the robot 100 can continuously perform the corresponding motion with respect to time.

Alternatively or additionally, the method 200 may further include a step of causing the robot 100 to speak the utterance in synchronization with the gesture. In this way, a more natural and smoother communication between a human and a robot can be achieved.

In some embodiments, the gesture library 108 or the labanotation may be stored at a remote server 200, such as a cloud computer, as illustrated in FIG. 1. In this case, the user may easily update gesture by editing/change the labanotation on the cloud computer, as required. This is quite helpful especially for avoiding user's boredom due to the repeated and same gestures every day. In other words, by changing the labanotation, the robot 100 is allowed to perform different gestures every day. Of course, it is also possible to store the gesture library 108 or the labanotation in local, for example, in the apparatus 10.

In some embodiments, only some part of the gesture library 108 is stored at a remote server 200, while some other part of the gesture library 108 is stored in local. As mentioned above, for some specialized conversations, specialized gestures as part of gesture library 108 can be designed using labanotation and saved locally, while for the random/general conversations, general gestures as the other part of the gesture library 108 will be stored at a remote server 200.

Figure 5:
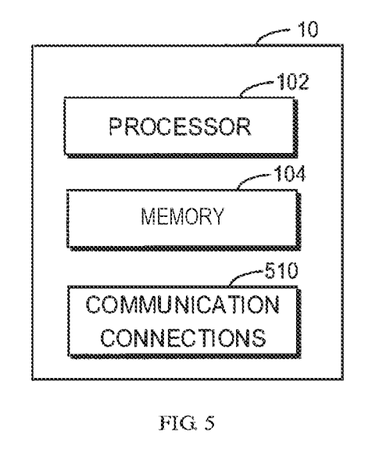
FIG. 5 is a block diagram of an apparatus suitable for implementing one or more implementations of the subject matter described herein.

FIG. 5 is a block diagram of apparatus 10 suitable for implementing one or more implementations of the subject matter described herein. For example, the apparatus 10 may function as discussed above with reference to FIG. 1. It is to be understood that the apparatus 10 is not intended to suggest any limitation as to scope of use or functionality of the subject matter described herein, as various implementations may be implemented in diverse general-purpose or special-purpose computing environments.

As shown, the apparatus 10 includes at least one processing unit (also called processor) 102 and a memory 104. The processing unit 102 executes computer-executable instructions and may be a real or a virtual processor. In a multi-processing system, multiple processing units execute computer-executable instructions to increase processing power. The memory 104 may be volatile memory (e.g., registers, cache, RAM), non-volatile memory (e.g., ROM, EEPROM, flash memory), or some combination thereof.

In accordance with implementations of the subject matter described herein, the memory 104 is coupled to the processing unit 102 and storing instructions for execution by the processing unit 102. Those instructions, when executed by the processing unit 102, causes the apparatus 10 to: receive a utterance to be spoken by the robot 100; determine a concept ($C_1$, $C_2$, . . . , $C_N$) corresponding to the received utterance; retrieve, from predetermined gesture library 108, a symbolic representation ($SR_1, SR_2, \ldots, SR_N$) of a gesture that is paired with the determined concept ($C_1, C_2, \ldots, C_N$); and cause the robot 100 to execute the symbolic representation to perform the gesture.

In the example shown in FIG. 4, the apparatus 10 further includes one or more communication connections 510. An interconnection mechanism (not shown) such as a bus, controller, or network interconnects the components of the apparatus 10. Typically, operating system software (not shown) provides an operating environment for other software executing in the apparatus 10, and coordinates activities of the components of the apparatus 10.

The communication connection(s) 510 enables communication over a communication medium to another computing entity. Additionally, functionality of the components of the apparatus 10 may be implemented in a single computing machine or in multiple computing machines that are able to communicate over communication connections. Thus, the apparatus 10 may operate in a networked environment (for example, the robot system environment 1000) using logical connections to one or more other servers, network PCs, or another common network node. By way of example, and not limitation, communication media include wired or wireless networking techniques.

Hereinafter, some example implementations of the subject matter described herein will be enumerate.

In some embodiments, a method for robot gesture generation is provided. The method comprises: determining a concept corresponding to a utterance to be spoken by a robot; retrieving, from a predetermined gesture library, a symbolic representation of a gesture that corresponds to the determined concept; and providing the symbolic representation ($SR_1, SR_2, \ldots, SR_N$) to cause the robot to perform the gesture.

In some embodiments, retrieving the symbolic representation comprises: retrieving a labanotation defining orientations of at least one body part of the robot with respect to a plurality of time slots.

In some embodiments, the method further comprises creating the gesture library by: capturing a gesture of a performer; determining, from the captured gesture, orientations of the at least one body part of the performer in the plurality of time slots; generating symbols representing the orientations in association with the corresponding time slots as a part of the labanotation.

In some embodiments, the method further comprises grouping a plurality of labanotations into a cluster of labanotation; and determining, from the cluster of labanotation, a representative labanotation.

In some embodiments, at least a part of the gesture library is stored at a remote server.

In some embodiments, the at least one body part includes a plurality of body parts, and the labanotation includes a first dimension corresponding to the plurality of time slots and a second dimension corresponding to the plurality of body parts.

In some embodiments, providing the symbolic representation to cause the robot to perform the gesture comprises: executing the labanotation along the first dimension to trigger the plurality of body parts to perform the gesture according to the respective orientations in the plurality of time slots.

In some embodiments, the method further comprises: causing the robot to speak the utterance in synchronization with the gesture.

In some embodiments, the predetermined gesture library includes a plurality of first vectors representing a plurality of concepts, respectively, and the retrieving, from a predetermined gesture library, a symbolic representation of a gesture that corresponds to the determined concept comprises: obtaining a second vector representing the utterance; determining similarity degrees of the second vector to the plurality of first vectors; and selecting, from the plurality of concepts, the concept corresponding to the utterance based on the similarity degrees.

In some embodiments, the gesture library includes a plurality of first vectors representing a plurality of concepts, respectively, and the retrieving, from a predetermined gesture library (108), a symbolic representation of a gesture that corresponds to the determined concept comprises: obtaining a second vector representing the utterance; determining similarity degrees of the second vector to the plurality of first vectors; and selecting, from the plurality of concepts, the concept corresponding to the utterance based on the similarity degrees; determining a cluster of symbolic representation to which the selected concept corresponds; and retrieving, from the cluster of symbolic representation, a representative symbolic representation.

In some embodiments, an apparatus for robot gesture generation is provided. The apparatus comprises: a processing unit; and a memory coupled to the processing unit and storing instructions for execution by the processing unit, the instructions, when executed by the processing unit, causing the apparatus to: determine a concept corresponding to a received utterance to be spoken by a robot; retrieve, from a predetermined gesture library, a symbolic representation of a gesture that corresponds to the determined concept; and provide the symbolic representation to cause the robot to perform the gesture.

In some embodiments, retrieving the symbolic representation comprises: retrieving a labanotation defining orientations of at least one body part of the robot with respect to a plurality of time slots.

In some embodiments, the apparatus is further configured to create the gesture library by: capturing a gesture of a performer; determining, from the captured gesture, orientations of the at least one body part of the robot in the plurality of time slots; generating symbols representing the orientations in association with the corresponding time slots as a part of the labanotation; and relating the labanotation to a concept.

In some embodiments, the apparatus is further configured to group a plurality of labanotations into a cluster of labanotation; and determine, from the cluster of labanotation, a representative labanotation.

In some embodiments, at least part of the gesture library is stored at a remote server.

In some embodiments, the at least one body part includes a plurality of body parts, and the labanotation includes a first dimension corresponding to the plurality of time slots and a second dimension corresponding to the plurality of body parts.

In some embodiments, providing the symbolic representation to cause the robot to perform the gesture comprises: executing the labanotation along the first dimension to trigger the plurality of body parts to perform the gesture according to the respective orientations in the plurality of time slots.

In some embodiments, the apparatus is further configured to: cause the robot to speak the utterance in synchronization with the gesture.

In some embodiments, the predetermined gesture library includes a plurality of first vectors representing a plurality of concepts, respectively, and the retrieving, from a predetermined gesture library (108), a symbolic representation of a gesture that corresponds to the determined concept comprises: obtaining a second vector representing the utterance; determining similarity degrees of the second vector to the plurality of first vectors; and selecting, from the plurality of concepts, the concept corresponding to the utterance based on the similarity degrees.

In some embodiments, the gesture library includes a plurality of first vectors representing a plurality of concepts, respectively, and the retrieving, from a predetermined gesture library, a symbolic representation of a gesture that corresponds to the determined concept comprises: obtaining a second vector representing the utterance; determining similarity degrees of the second vector to the plurality of first vectors; and selecting, from the plurality of concepts, the concept corresponding to the utterance based on the similarity degrees; determining a cluster of symbolic representation to which the selected concept corresponds; and retrieving, from the cluster of symbolic representation, a representative symbolic representation.

In some embodiments, a computer program product for storage of a solid-state drive is provided. The computer program product is tangibly stored on a non-transient computer-readable medium and comprising machine-executable instructions, the machine-executable instructions, when executed, causing a machine to: determine a concept corresponding to a received utterance to be spoken by the robot; retrieve, from predetermined gesture library, a symbolic representation of a gesture that corresponds to the determined concept; and provide the symbolic representation to cause the robot to perform the gesture.

In some embodiments, retrieving the symbolic representation comprises: retrieving a labanotation defining orientations of at least one body part of the robot with respect to a plurality of time slots.

In some embodiments, the computer program further comprises causing a machine to: create the gesture library by: capturing a gesture of a performer; determining, from the captured gesture, orientations of the at least one body part of the performer in the plurality of time slots; generating symbols representing the orientations in association with the corresponding time slots as a part of the labanotation; and relating the labanotation to a concept.

In some embodiments, at least part of the gesture library is stored at a remote server.

It should be appreciated that the above detailed embodiments of the present disclosure are only to exemplify or explain principles of the present disclosure and not to limit the present disclosure. Therefore, any modifications, equivalent alternatives and improvement, etc. without departing from the spirit and scope of the present disclosure shall be included in the scope of protection of the present disclosure. Meanwhile, appended claims of the present disclosure aim to cover all the variations and modifications falling under the scope and boundary of the claims or equivalents of the scope and boundary.

What is claimed is:

1. A method, performed by a processing unit, for robot gesture generation, comprising:
    determining a concept ($C_1, C_2, \ldots, C_N$) corresponding to an utterance to be spoken by a robot:
    retrieving, from a predetermined gesture library, a symbolic representation ($SR_1, SR_2, \ldots, SR_N$) of a gesture that corresponds to the determined concept ($C_1, C_2, \ldots, C_N$);
    providing the symbolic representation ($SR_1, SR_2, \ldots, SR_N$) to cause the robot to perform the gesture.

2. The method of claim 1, wherein retrieving the symbolic representation ($SR_1, SR_2, \ldots, SR_N$) comprises: retrieving a labanotation ($LA_1, LA_2, \ldots, LA_N$) defining orientations of at least one body part of the robot with respect to a plurality of time slots.

3. The method of claim 2, further comprising creating the gesture library by:
    capturing a gesture of a performer;
    determining, from the captured gesture, orientations of the at least one body part of the performer in the plurality of time slots;
    generating symbols representing the orientations in association with the corresponding time slots as a part of the labanotation; and
    relating the labanotation to a concept.

4. The method of claim 3, further comprising:
    grouping a plurality of labanotations into a cluster of labanotation; and
    determining, from the cluster of labanotation, a representative labanotation.

5. The method of claim 1, wherein at least a part of the gesture library is stored at a remote server.

6. The method of claim 2, wherein the at least one body part includes a plurality of body parts, and the labanotation includes a first dimension corresponding to the plurality of time slots and a second dimension corresponding to the plurality of body parts.

7. The method of claim 6, wherein providing the symbolic representation to cause the robot to perform the gesture comprises:
    executing the labanotation along the first dimension to trigger the plurality of body parts to perform the gesture according to the respective orientations in the plurality of time slots.

8. The method of claim 1, further comprising:
    causing the robot to speak the utterance in synchronization with the gesture.

9. The method of claim 1, wherein the gesture library includes a plurality of first vectors representing a plurality of concepts, respectively, and the retrieving, from a predetermined gesture library, a symbolic representation ($SR_1, SR_2, \ldots, SR_N$) of a gesture that corresponds to the determined concept ($C_1, C_2, \ldots, C_N$) comprises:
    obtaining a second vector representing the utterance;
    determining similarity degrees of the second vector to the plurality of first vectors; and
    selecting, from the plurality of concepts, the concept corresponding to the utterance based on the similarity degrees.

10. The method of claim 4, wherein the gesture library includes a plurality of first vectors representing a plurality of concepts, respectively, and the retrieving, from a predetermined gesture library a symbolic representation ($SR_1, SR_2, \ldots, SR_N$) of a gesture that corresponds to the determined concept ($C_1, C_2, \ldots, C_N$) comprises:
    obtaining a second vector representing the utterance;
    determining similarity degrees of the second vector to the plurality of first vectors;
    selecting, from the plurality of concepts, the concept corresponding to the utterance based on the similarity degrees;
    determining a cluster of symbolic representation to which the selected concept corresponds; and
    retrieving, from the cluster of symbolic representation, a representative symbolic representation.

11. An apparatus for robot gesture generation, comprising:
a processing unit; and
a memory coupled to the processing unit and storing instructions for execution by the processing unit, the instructions, when executed by the processing unit, causing the apparatus to:
determine a concept ($C_1, C_2, \ldots, C_N$) corresponding to a received utterance to be spoken by a robot;
retrieve, from a predetermined gesture library, a symbolic representation ($SR_1, SR_2, \ldots, SR_N$) of a gesture that corresponds to the determined concept ($C_1, C_2, \ldots, C_N$); and
provide the symbolic representation ($SR_1, SR_2, \ldots, SR_N$) to causing the robot to perform the gesture.

12. The apparatus of claim 11, wherein retrieving the symbolic representation ($SR_1, SR_2, \ldots, SR_N$) comprises:
retrieving a labanotation ($LA_1, LA_2, \ldots, LA_N$) defining orientations of at least one body part of the robot with respect to a plurality of time slots.

13. The apparatus of claim 12, wherein the apparatus is further configured to create the gesture library by:
capturing a gesture of a performer;
determining, from the captured gesture, orientations of the at least one body part of the performer in the plurality of time slots;
generating symbols representing the orientations in association with the corresponding time slots as a part of the labanotation; and
relating the labanotation to a concept.

14. The apparatus of claim 13, wherein the apparatus is further configured to:
group a plurality of labanotations into a cluster of labanotation; and
determine, from the cluster of labanotation, a representative labanotation.

15. The apparatus of claim 11, wherein at least part of the gesture library are stored at a remote server.

16. The apparatus of claim 12, wherein the at least one body part includes a plurality of body parts, and the labanotation includes a first dimension corresponding to the plurality of time slots and a second dimension corresponding to the plurality of body parts.

17. The apparatus of claim 16, wherein providing the symbolic representation to cause the robot to perform the gesture comprises:
executing the labanotation along the first dimension to trigger the plurality of body parts to perform the gesture according to the respective orientations in the plurality of time slots.

18. The apparatus of claim 11, wherein the predetermined gesture library (108) includes a plurality of first vectors representing a plurality of concepts, respectively, and the retrieving, from a predetermined gesture library, a symbolic representation ($SR_1, SR_2, \ldots, SR_N$) of a gesture that corresponds to the determined concept ($C_1, C_2, \ldots, C_N$) comprises:
obtaining a second vector representing the utterance;
determining similarity degrees of second vector to the plurality of first vectors; and
selecting, from the plurality of concepts, the concept corresponding to the utterance based on the similarity degrees.

19. The apparatus of claim 11, wherein the gesture library includes a plurality of first vectors representing a plurality of concepts, respectively, and the retrieving, from a predetermined gesture library, a symbolic representation ($SR_1, SR_2, \ldots, SR_N$) of a gesture that corresponds to the determined concept ($C_1, C_2, \ldots, C_N$) comprises:
obtaining a second vector representing the utterance;
determining similarity degrees of second vector to the plurality of first vectors; and selecting, from the plurality of concepts, the concept corresponding to the utterance based on the similarity degrees;
determining a cluster of symbolic representation to which the selected concept corresponds; and
retrieving, from the cluster of symbolic representation, a representative symbolic representation.

20. A computer program product for storage of a solid-state drive, the computer program product being tangibly stored on a non-transient computer-readable medium and comprising machine-executable instructions, the machine-executable instructions, when executed, causing a machine to:
determine a concept ($C_1, C_2, \ldots, C_N$) corresponding to a received utterance to be spoken by the robot;
retrieve, from predetermined gesture library, a symbolic representation ($SR_1, SR_2, \ldots, SR_N$) of a gesture that corresponds to the determined concept ($C_1, C_2, \ldots, C_N$); and
provide the symbolic representation ($SR_1, SR_2, \ldots, SR_N$) to cause the robot to perform the gesture.

* * * * *